United States Patent [19]

Carlson

[11] Patent Number: 4,976,619
[45] Date of Patent: Dec. 11, 1990

[54] PASSIVE LOCATION METHOD

[75] Inventor: Eric J. Carlson, Mesa, Ariz.

[73] Assignee: Motorola, Inc., Schaumburg, Ill.

[21] Appl. No.: 319,496

[22] Filed: Mar. 6, 1989

[51] Int. Cl.$^5$ .......................... F41G 1/00; F41G 3/26
[52] U.S. Cl. ........................................ 434/16; 434/27;
434/21; 434/19; 273/310; 364/423; 364/460;
364/458
[58] Field of Search ............... 273/310, 311, 371, 372;
434/16, 17, 19, 22, 21, 27; 364/458, 460, 461,
462, 423

[56] References Cited

U.S. PATENT DOCUMENTS

| | | | |
|---|---|---|---|
| 3,487,226 | 12/1969 | Yetter et al. | 273/371 |
| 3,659,085 | 4/1972 | Potter et al. | 364/300 |
| 3,778,059 | 12/1973 | Rohrbaugh et al. | 434/19 |
| 3,807,858 | 4/1974 | Finch | 273/371 |
| 3,821,523 | 6/1974 | Chisholm et al. | 364/460 |
| 3,886,553 | 5/1975 | Bates | 364/452 |
| 4,229,737 | 10/1980 | Heldwein et al. | 342/52 |
| 4,682,953 | 7/1987 | Doerfel et al. | 434/16 |
| 4,744,761 | 5/1988 | Doerfel et al. | 434/16 |

Primary Examiner—Edward M. Coven
Assistant Examiner—Jessica J. Harrison
Attorney, Agent, or Firm—Frank J. Bogacz

[57] ABSTRACT

A method for pinpointing the actual coordinate location of a passive location device for a simulated battlefield condition is described. A plurality of actuators transmit to a passive location device which includes the method for determining its coordinate location. The coordinate location of a desired impact point is transmitted to the location device. The determination method initializes a starting coordinate location as the impact point of a round of munition. The method then iteratively determines the gradient direction of the position and moves the position estimate in the direction of gradient. As the estimated position approaches the true position successively smaller steps are taken and additional coordinate directions introduced into the solution until the convergence solution is terminated with least rms error in the neighborhood of the true coordinate position of the passive location device.

22 Claims, 5 Drawing Sheets

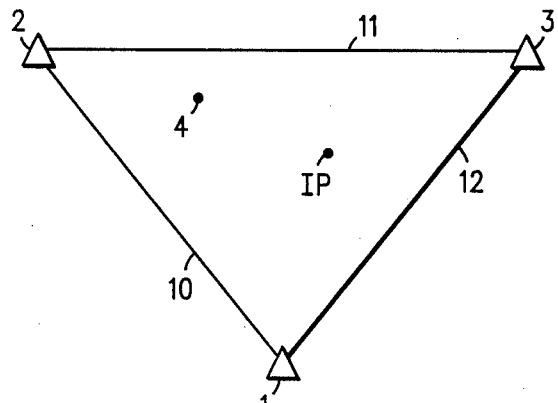
FIG. 1
FIG. 2
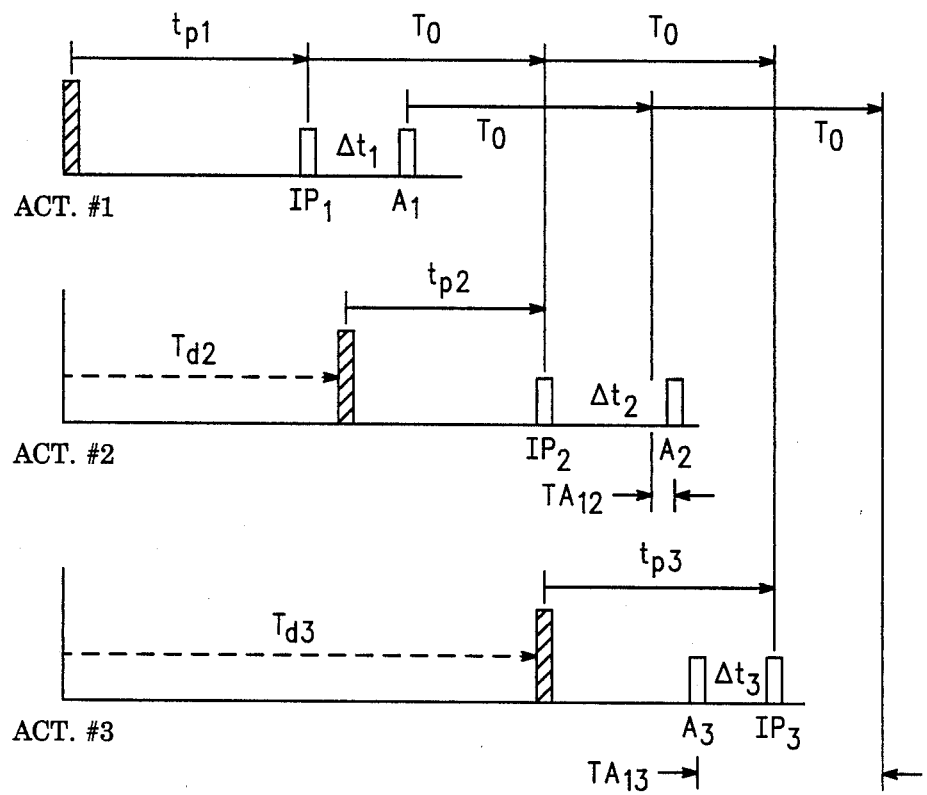

PASSIVE LOCATION METHOD

BACKGROUND OF THE INVENTION

The present invention pertains to simulated battlefield position location and more particularly to passive position location for determining the effects of simulated munitions deployment on a target.

Position detectors may be used to find the location of individuals or vehicles with respect to simulated munitions to determine whether injury or damage was inflicted on the individuals or vehicles. A battlefield for a war game is established. Boundaries of this battlefield are marked by actuators. These actuators emit coded transmissions which cover the area of the battlefield. These location detectors may be active or passive. Active location detectors interact with the actuators to both receive messages from the actuators and transmit messages to the actuators. Passive location detectors receive transmissions from the actuators and determine their position relative to a predetermined impact point of the munition.

Active location devices contain transmitters and receivers. Passive location devices include receivers only By eliminating the transmitter portion of a position locator, passive location detectors may be made to be less expensive, more reliable and more operable in a hostile environment.

Doerfel et al. U.S. Pat. No. 4,682,953, issued on July 28, 1987 and Doerfel et al. U.S. Pat. No. 4,744,761, issued on May 17, 1988 teach and describe one such passive location detection device. This passive location device uses a time-windowing technique which generates a polygon-shaped area in which the target is probably located. The number of sides of this polygon is related to the number of actuators used. For example, three actuators generate a six-sided polygon. When the target PDD is located along a border of the polygon area encompassed by the actuators, the polygon produced is substantially elongated and distorted. Such distortion of the area in which the target Passive Detection Device (PDD) is located results in a possible indication of harm or damage when none was truly inflicted or a possible indication of no damage when damage was actually inflicted. Because the target PDD is located only within a bounded area and because of the distortion when a PDD is near the boundary of the actuator area, the passive location device described in the references can produce many false readings.

As a result, it is an object of the present invention to provide a passive location detector which determines the 15 actual coordinate position (rather than position within a window) of a target PDD with minimal error.

SUMMARY OF THE INVENTION

In accomplishing the object of the present invention, a novel method for passive location is shown.

A passive location method determines the coordinate position of a passive detection device relative to an impact point of a round of munition in a simulated battlefield exercise. A number of actuators transmit messages to the passive detection device.

First, the passive location method initializes a plurality of parameters by means of an initialization message. Next, the method sets the initial coordinate position estimate of the PDD as the coordinate position of the impact point of the munition. Next, a sequence of new coordinate positions with respect to the initial coordinate position are examined to establish a position error "gradient".

For each of the coordinate positions examined, an error metric is found. The smallest error metric is determined and its corresponding coordinate direction determined. Then a new PDD position estimate is located a predetermined distance from the previous coordinate position in the coordinate direction of the smallest error metric.

Lastly, the method is iterated until a new coordinate position is produced which converges to the true position of the passive detection device by continuous minimization of the error metric. A determination may then be made whether the PDD and its associated personnel or vehicle is killed, wounded or damaged.

BRIEF DESCRIPTION OF THE DRAWINGS

FIG. 1 is a geometric diagram showing the preferred embodiment of the present invention.

FIG. 2 is a timing diagram of the passive location detector operation;

DESCRIPTION OF THE PREFERRED EMBODIMENT

Figure 3A:
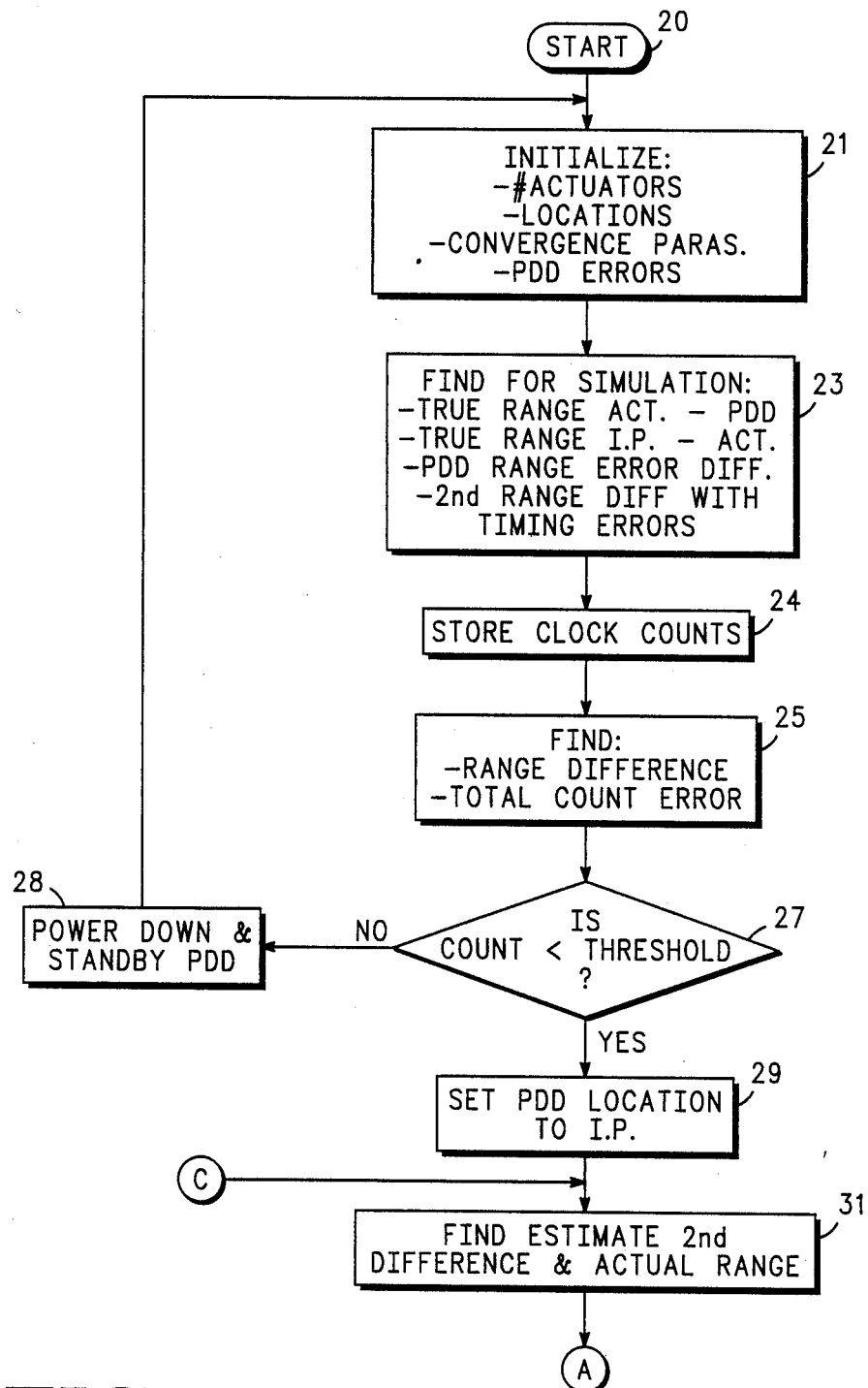
FIGS. 3A, 3B and 3C are a flow chart of the location detection method of the present invention.

U.S. Pat. Nos. 4,682,953 and 4,744,761 are hereby incorporated by reference.

FIG. 1 depicts a layout of a war game battlefield encompassed by lines 10, 11 and 12. This area includes actuators 1, 2 and 3. The number of actuators shown here in FIG. 1 is not by way of limitation, but by way of explanation. Current design and technology permit up to five actuators to encircle the war game battlefield, but at least three actuators are required for establishing location within the war game battlefield bounded by lines 10, 11 and 12. PDD location outside the bounded area is also possible, but degraded location accuracy results.

Point 4 within the encircled area of FIG. 1 denotes the location of a particular target. This target includes a PDD (Passive Detection Device). This basic configuration is similar to the above incorporated references. The difference is that the system shown in the references locates targets only within a certain area within the war game battlefield as delineated by the time-windows established by the actuator timing sequence. This area may be distorted if the target PDD is near a boundary, such as 10, 11 or 12. The present invention provides an actual pinpoint location of a target by solution of the location equations in a suitably programmed microprocessor. The combination of location equations, a developed software algorithm and incorporation of microprocessing technology comprise this invention.

Point IP within the encircled area of FIG. 1 is the predetermined impact point of a particular round of exploded munition. People or equipment within a basically circular zone around the impact point are either damaged or mortally wounded. People and equipment within a larger radius of the impact point may be injured or slightly damaged. Personnel and equipment outside these zones survive undamaged.

The actuators 1, 2 and 3 may be separated by as much as 20 km, as long as there is line of sight contact with the impact point IP.

In the following explanation, actuator 1 acts as the primary or reference transmitter. An initialization message is transmitted by the primary transmitter, in this case actuator 1. The target 4 (personnel or vehicle) contains the passive detection device (PDD). This initialization message includes the coordinate location of each of the actuators and the impact point. In an alternate form of the invention, these initialization messages may be prestored in an electronically erasable programmable read-only-memory (EEPROM) located within the PDD unit. See FIG. 4.

The initializing actuator 1 radiates a coded pulse into the battlefield (exercise) area shown as "Act#1" in FIG. 2. The remaining actuator transmissions are delayed by predetermined amounts, $T_{d2}$, $T_{d3}$, etc. This coded pulse is match-filtered by the PDD to produce a narrow synchronization pulse $A_1$ in FIG. 2, or as $IP_1'$, if the PDD is located at the impact point. A high-speed counter within the PDD begins counting when the coded pulse is detected. The counter of the PDD then continuously counts at a predetermined rate. The value of this count is determined when a pulse from a second actuator is detected by the PDD at time $A_2$. Thus, a $\Delta$ time difference is measured from the last full count, $T_0$, beginning when the PDD received a coded pulse of actuator 1 until the pulse is received by the PDD from the second actuator; this time difference is denoted by $TA_{12}$.

The time interval between actuator pulses received at the PDD location is known to be precisely $T_0$ representing an integral number of counts of the system clock (not shown).

The PDD then continues counting awaiting a pulse from actuator 3. Upon the arrival of this coded pulse, a second time difference is computed, $TA_{13}$. This procedure is repeated for each of the actuators employed in the particular configuration. When this information is collected by the PDD, the passive location method is executed by the PDD based upon the information measured according to the counts obtained.

Figure 3B:
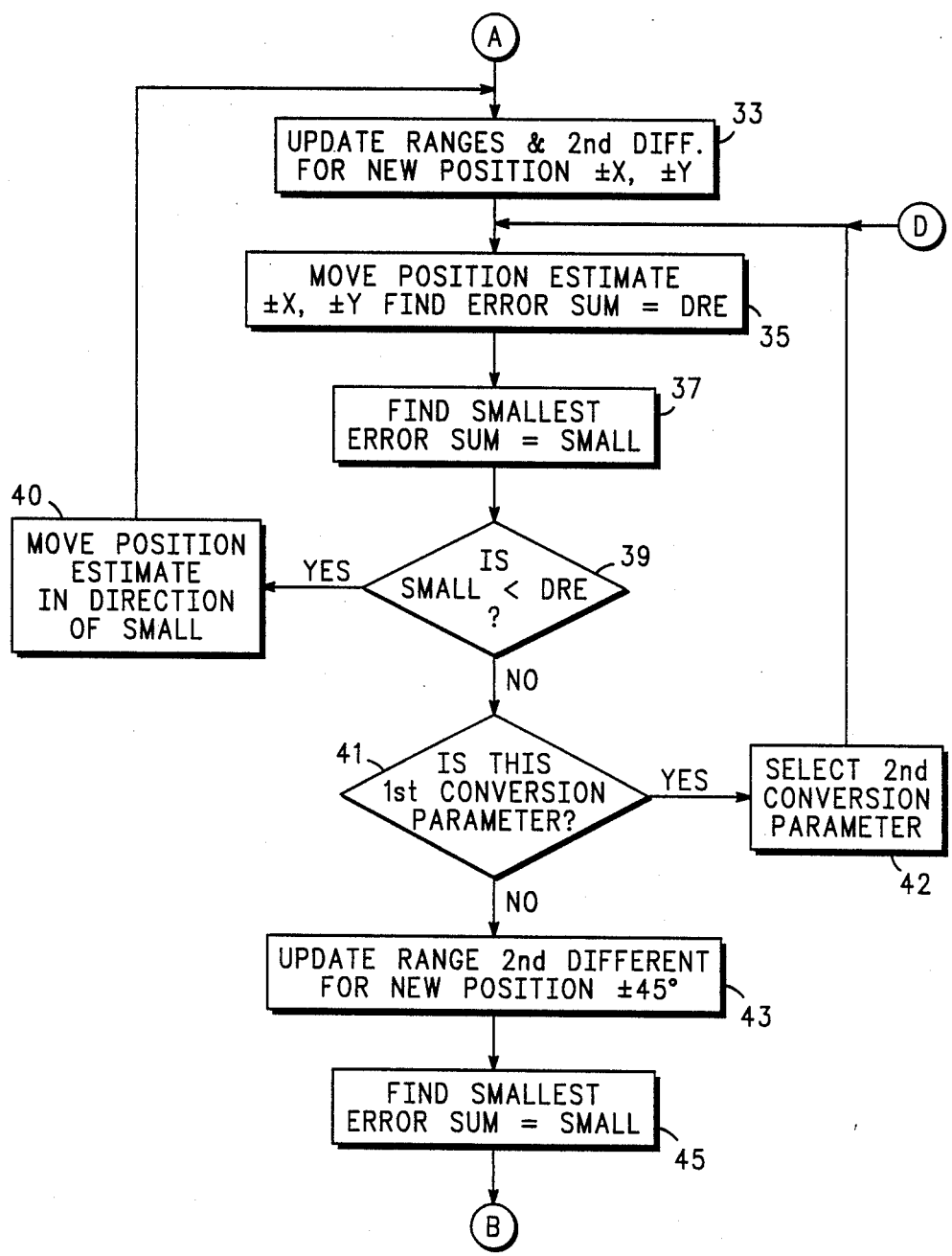
Figure 3C:
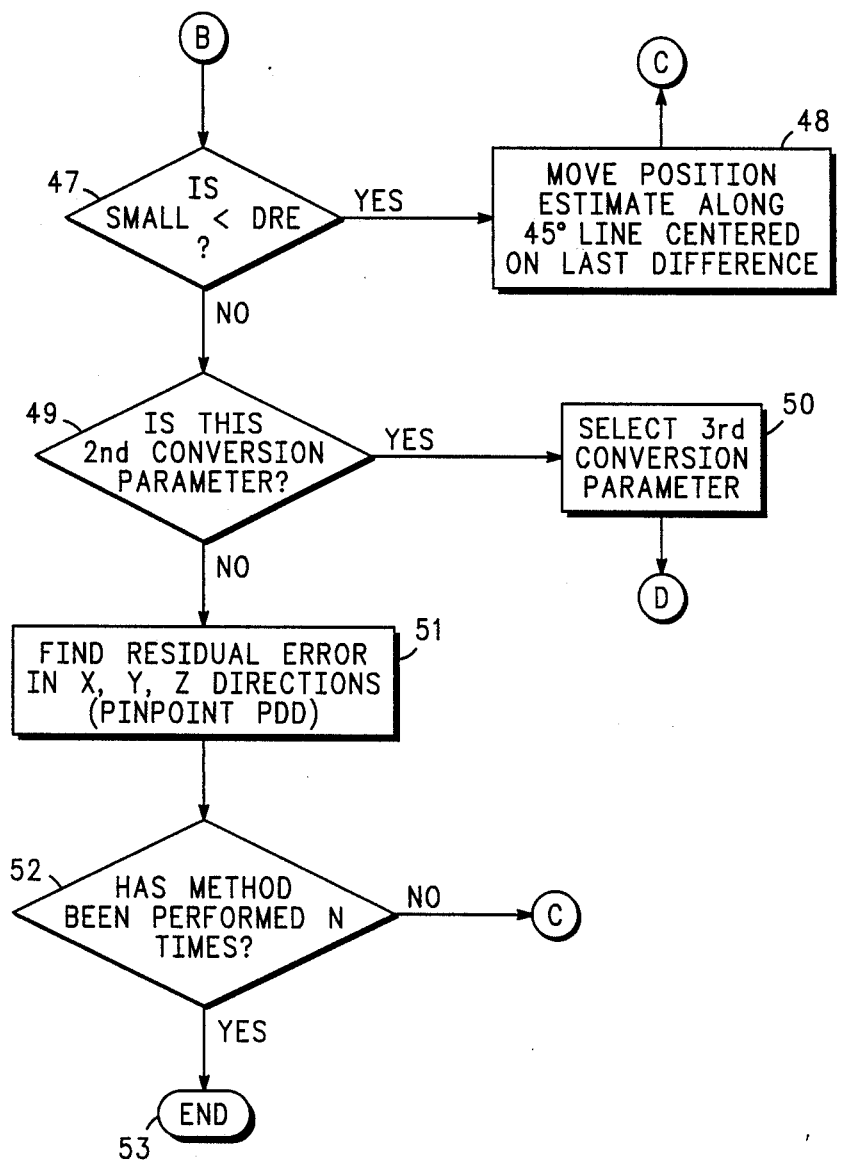

Referring to FIGS. 3A-C, the solution to the location equations (1) through (5) is determined via the disclosed software algorithm, and the system development computer simulation also shown in FIG. 3.

The passive location method iteratively calculates a position error gradient. As a result of this calculated position error gradient, the estimated location coordinates of the PDD may be moved successively closer to the true location of the PDD. The convergence parameter which is iteratively minimized is given by equation (1):

$$\text{ERROR} = \sum_{i=2}^{N} \text{abs}[TA_i - ta_i] \quad (1)$$

where $TAi$ is the measured timing difference error given by equation (2):

$$TA_i = \Delta T_i - \Delta T_1 \quad (2)$$

where $\Delta T_i$ is the number of clock cycles $T_0$ measured from the time the PDD receives the coded pulse of the first actuator to respond and $ta_i$ is the estimated timing difference error as determined by the latest position estimate of the PDD and N is the number of actuators.

Equation (1) given above is solved choosing an optimal starting position and then moving the solution in the direction which minimizes the error. For the purposes of this explanation, it will be assumed that the surfaces within the encircled war game area are approximately of equal altitude and therefore no Z-axis coordinate exists. A two-dimensional X-Y coordinate plane is assumed. However, the method shown applies equally well to three-dimensional solutions as revealed by the disclosed system simulation.

The impact point IP is chosen as the starting point. Incremental steps are taken from the impact point and the resultant error measured in the four coordinate ($\pm X, \pm Y$) directions. A candidate error metric is computed by the microprocessor at a new location given by equation (3) below; this metric is seen to be the second range difference (the difference of the timing differences):

$$\text{ERROR}_\beta = \sum_{i=2}^{N} \text{abs}[TA_i - ta_{\beta i}], \quad (3)$$
$$\beta = 1,2,3,4$$

where $\beta$ refers to each of the four candidate directions ($+X, -X, +Y$ and $-Y$) with coordinates $$X_\beta = X_0 \pm \Delta X_{62} \quad (4)$$
$$Y_B = Y_0 \pm \Delta Y_\beta \quad (5)$$

and $X_0$ and $Y_0$ refers to the present position of the estimate in the iterative solution and the increments of position change $\Delta X_\beta$ and $\Delta Y_{62}$ assume 1 of 3 successively decreasing magnitudes of distance as the method converges to the true position. More than 3 convergence parameters may be used. The four values of $\text{ERROR}_{62}$ are compared with the present value of ERROR given by equation (1) above. Movement of an assumed position is allowed to occur in the direction of the 2 smallest $\text{ERROR}_{62}$ as long as this $\text{ERROR}_\beta$ value is smaller than the present value of ERROR. When this test fails, the next smaller movement increment (one of a predetermined set of convergence distance parameters) is implemented until the method detects that no further movement will decrease ERROR.

As movement in the above four directions converges to the true position of the PDD, movement in four additional directions is added to supplement the estimation of the true position of the PDD. These four added directions are located 45° from each of the principal X-Y coordinate directions. As a result, the passive detection method is able to converge to the true position of the PDD as the value of ERROR approaches zero.

As mentioned above, a microprocessor of the PDD supports and controls the execution of the passive location method of the present invention. FIGS. 3A-C show the details of this method. Initially, the PDD is in the standby mode in order to conserve power. The reception of the initialization pulse acts to "wake up" the PDD. The PDD determines at the first stage of processing whether or not its location is within an acceptable radius of lethality. The PDD returns to the standby mode to conserve power if the radius of convergence is too large, block 27, the metric in this stage is the total actuator count error and the threshold is a predetermined operator input. FIG. 3A primarily shows initialization of the computer simulation; FIG. 3B and 3C primarily shows the actual convergence algorithm to be stored in the PDD.

First, the number of actuators, the location of the actuators, the conversion movement parameters and the PDD location errors relative to the IP are initialized by the method, block 21. The PDD location errors relative to the IP are peak-to-peak location errors of the PDD relative to the impact point IP. The three convergence parameters are read from the input message of actuator 1. As an example, these convergence parameters may be initialized at 70 meters, 10 meters and 3 meters in that order. These parameters determine the step size or distance of the movement from the impact point toward the true location of the PDD and are chosen to minimize the total computation of the position estimate.

Next, the true range of the actuator to the PDD is determined for simulation purposes. The true range of the impact point IP to the actuator is also determined. Next, the timing error due to noise is calculated by the simulation. Lastly, a second range difference including timing error is calculated. All of the above functions are performed by block 23 and represent true data to be measured by the PDD counters if actually deployed.

The range errors of the actuators relative to the impact point are measured and the corresponding clock count range error is stored, block 24. Next, the measured range difference or errors relative to the impact point are found and the total count error including timing noise is found, block 25.

Next, it is determined whether this particular PDD is close enough to the impact point. That is, it is determined whether the total clock count is less than a predetermined threshold value. This threshold value may be either transmitted in the initialization message or may be preprogrammed within the PDD. If the number of counts actually determined is less than the threshold value, block 27 transfers control to block 29 and the location method is continued. If the number of counts is greater than the threshold, this indicates that the particular PDD is out of the range of any affect of the particular munition described by this message transmission. As a result, block 27 transfers control to block 28 via the NO path. Block 28 powers down the PDD and places it in the standby mode. Block 28 then transfers control to block 21 and waits for a subsequent initialization of the method when another message indicating a simulated munitions detonation is received.

If the PDD is within range of the detonated munition, block 27 transfers control to block 29 where the initial estimate of the PDD location is set to the coordinate location of the impact point; this begins the actual locations algorithm. Next, a new coordinate position is selected relative to the impact point IP. This represents a step using the first convergence parameter from the impact point along the $\pm X$ and $\pm Y$ coordinate directions. The second difference given by equation (1) above is calculated using these range coordinates, block 31. The ranges from the actuators to the new position are determined for the movement along the X-Y coordinate directions. Next, for the new coordinate position estimate A an error sum is found by applying equation (3) given above. For each of the four coordinate directions, an error sum is found and a total DRE is calculated, block 35. Next, the smallest error sum of the four, SMALL, is found, block 37.

Block 39 compares the value SMALL, to the value of the total ERROR sum of the new position estimate for all actuators relative to the impact point DRE. If the value of SMALL is less than the value of DRE, block 39 transfers control to block 40 via the YES path. Block 40 oves the position estimate in the direction corresponding to SMALL (small error), which indicates the coordinate position most likely to be nearer the true location of the PDD. Block 40 then transfers control to block 33 to iterate the process described above.

If the value of SMALL was greater than or equal to the value of DRE, block 30 transfers control via the NO path to block 41. Since, in this case, the value of the smallest error sum was greater than or equal to the error sum of the new position, steps of this size or distance (convergence parameter) will not bring the coordinate position closer to the true position of the PDD. Therefore, block 41 determines whether this convergence parameter is the first parameter of the set. If this is the first convergence parameter, block 41 transfers control to block 42 via the YES path. Block 42 selects the second conversion parameter, which represents a smaller convergence distance and transfers control to block 35 to iterate the above process.

If this is not the first convergence parameter, block 41 transfers control to block 43 via the NO path.

Block 43 updates the range values for the second difference given by equation (3) for the new position. These new positions are such that they are selected at $\pm 45°$ relative to the X-coordinate positions. As a result, the passive location method now includes eight degrees of freedom in which to move to obtain the true position of the PDD.

Next, block 45 finds the smallest error sum, SMALL. Then block 47 determines whether the value of SMALL is less than the value of DRE which is the error sum for a new position using the convergence parameter selected. If SMALL is less than DRE, block 47 transfers control to block 48 via the YES path. Block 48 moves the position estimate along a 45° line centered upon the last location obtained. Block 47 then transfers control to block 31 to iterate the above process.

If DRE is greater than SMALL, block 47 transfers control to block 49 via the NO path. Block 49 determines whether the second convergence parameter is being used. If the the second convergence parameter is being used, block 49 transfers control to block 50 via the YES path. Block 50 selects the third conversion parameter which corresponds to steps of a smaller distance than the second conversion parameter. Block 50 transfers control to block 35 to iterate the above process.

If block 49 determines that the second convergence parameter is not being used (i.e., the third and final parameter has been used), it transfers control via the NO path, block 51. This terminates the actual PDD algorithm. Blocks 51 and 52 are performed for simulation purposes only. Since all three of the convergence parameters have been applied with the eight degrees of freedom, block 51 now indicates that the residual error in the X-Y-Z coordinate directions is suitably minimized and the X-Y-Z coordinates calculated now pinpoint the true location of the PDD. These coordinates precisely locate the PDD and its corresponding personnel or vehicle, so that the effects of the munition can be more accurately determined. Since the PDD location in terms of precise coordinates has been determined, the location may be passed to other software which determines the engagement probabilities. These probabilities include the probability of a kill, of damage, and the probability of escape given the coordinate position of a particular PDD.

Each of the probabilities depends upon the target type (personnel or vehicle), the weapon type (e.g. tank, cannon, Howitzer), range and angle with respect to the impact point IP. Block 51 then transfers control to block 53 where the method is ended, until the next initialization message is received.

A simplified view of damage assessment is that a weapons, effective area may be divided into two zones, the outer zone comprising the near-miss area and the inner zone comprising the lethal or kill area. Given the coordinate location of the PDD and the coordinate location of the impact point IP, which it received in the initialization message, the PDD may apply one of a number of techniques to determine the zone of this particular PDD relative to the impact of the specified munition. The parameters for various types of munitions may be stored in an EEPROM contained in the target PDD.

Figure 4:
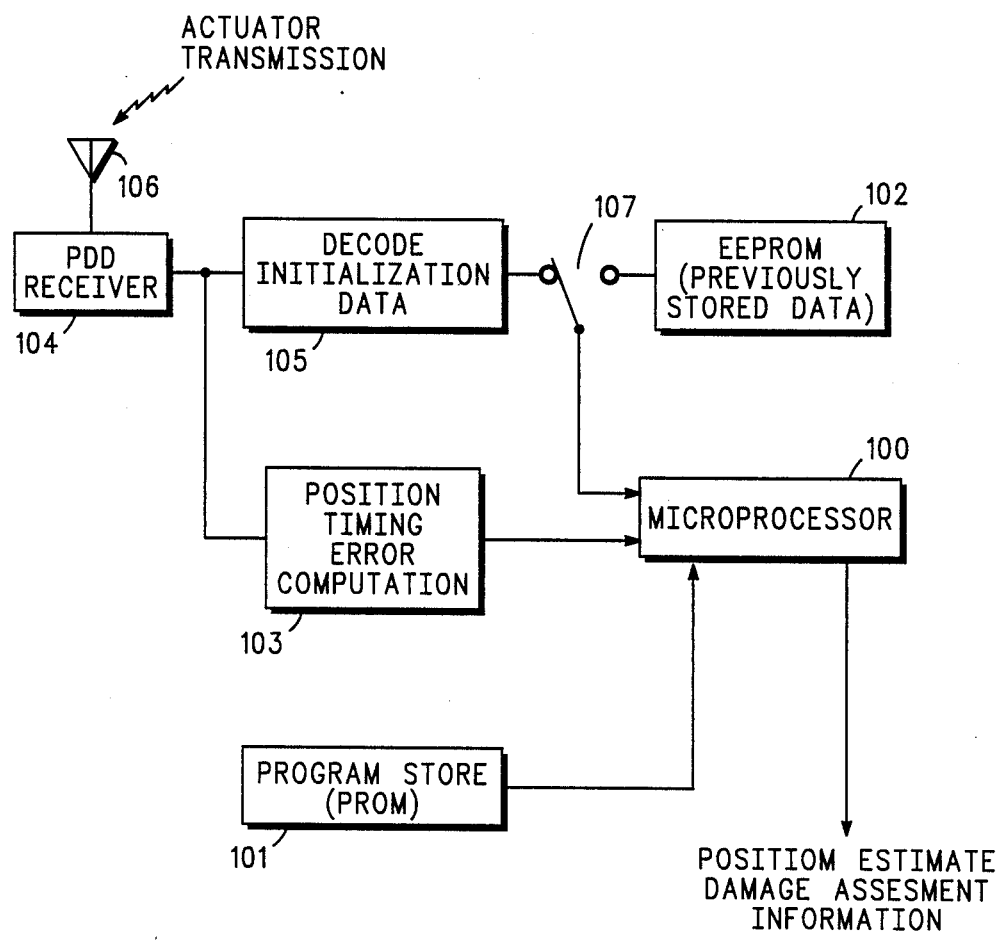
FIG. 4 is a block diagram of a portion of a PDD.

FIG. 4 depicts a portion of the electronics of a PDD. The PDD includes a microprocessor 100 which is connected to either PROM (Programmable Read-Only-Memory) 101 and EEPROM (Electronically Erasable Programmable Read-Only-Memory), 102. PROM 101 provides the storage for the instructions comprising the passive location method. Microprocessor 100 retrieves these instructions from PROM 101 and executes the passive location method described above. Antenna 106 actuator transmissions and sends the information to PDD receiver 104. PDD receiver 104 is connected to decode data 105 and to position timing error computation 103. Switch 107 allows data from the actuators through decode data 105 or previously stored data of EEPROM 102 to be transmitted to microprocessor 100 for analysis. In addition, position timing error computation 103 is connected to microprocessor 100. Initially and from time-to-time, the input parameters are programmed into EEPROM 102. These parameters described the various munitions types and the kill and near-miss regions associated with each type. Microprocessor 100 reads these parameters and performs probability estimates in order to determine the damage assessment of each PDD from a particular round of munitions. These parameters alsO include the convergence increments and ranges of IP to the actuators.

It is possible to employ mobile actuators in vehicles as shown in the references mentioned above. In addition, aircraft may provide actuators for the present invention. The detection accuracy of the present system would depend heavily on the accuracy of the aircraft navigation system. Instantaneous aircraft position data may be down-linked in a message to the PDD. More than one aircraft may be employed in a given location as long as the interrogation periods were separated as in a TDMA format, for example.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A passive location method for determining the actual coordinate position of personnel and vehicles, each having a passive location device, relative to an impact point of a round of munition in a simulated battlefield for assessing injuries and damage to said personnel and vehicles inflicted by the round of munition, including a plurality of actuators for transmitting messages to said passive location device, said passive location method comprising the steps of:

initializing said passive location device with a plurality of parameters by said transmitted messages of said actuators;

setting by said passive location device an initial coordinate position of said passive location device as being located at said impact point;

estimating by said passive location device a plurality of new coordinate positions and corresponding coordinate directions of said passive location device from a previous coordinate position to produce a new candidate coordinate position, said step of estimating including the step of selecting a first one of a set of convergence parameter;

finding by said passive location device coordinate directions from said plurality of coordinate directions having a smallest error metric derived from computation of second range differences for said estimated new coordinate positions, said step of finding including the steps of:

updating ranges of said new candidate coordinate position by said selected convergence parameter; and fifth finding an error sum for said updated ranges in each of said coordinate directions by said selected convergence parameter determining by said passive location device a new coordinate position of said passive location device located a distance of a predetermined step size from said previous coordinate position in said coordinate directions corresponding to said smallest error metric;

iterating by said passive location device said steps of estimating, finding and determining a predetermined number of times to produce said new coordinate position which converges to the actual position of said passive location device; and indicating by each said passive location device the affects of said round of munition on said personnel and vehicles, as having been hit or missed by said round of munition.

2. A passive location method as claimed in claim 1, wherein said step of initializing includes the steps of:

first obtaining an indication of a number of said actuators;

second obtaining a coordinate position corresponding to each of said actuators;

third obtaining a set of convergence parameters indicating a plurality of predetermined step sizes; and fourth obtaining location errors of said passive location device relative to said impact point.

3. A passive location method as claimed in claim 2, wherein there is further included the steps of:

storing a number of clock counts for said passive detection device and for each of the actuators relative to the impact point;

third finding a measured range error for each of said active actuators relative to said impact point; and fourth finding a total count error including timing noise error for each of said actuators relative to said impact point.

4. A passive location method as claimed in claim 3, wherein there is further included the steps of:

second determining whether said stored total clock count due to said plurality of actuators of said passive detection device is greater than a predetermined threshold value;

powering down said passive location device, if said clock count is greater than said predetermined threshold; and placing said passive location device in a standby mode.

5. A passive location method as claimed in claim 4, said step of determining including the steps of:

sixth finding a smallest error sum corresponding to a coordinate direction;

third determining whether the value of said smallest error sum is less than said error sum of said updated of coordinate positions;

moving said new coordinate position in the coordinate direction corresponding to said smallest error sum, if said smallest error sum is less than said error sum of said updated coordinate position; and second interating said steps of; updating, fifth finding, sixth finding, third determining and moving.

6. A passive location method as claimed in claim 5, wherein there is further included the steps of:

fourth determining whether said selected convergence parameter is said first one of said set, if said smallest error sum is greater than the error sum estimate;

selecting a second convergence parameter of said set; and third iterating said steps of fifth finding, sixth finding, third determining, moving and fourth determining.

7. A passive location method as claimed in claim 6, wherein there is further included the steps of:

second updating said ranges for new coordinate positions of a second plurality of coordinate positions being at approximately 45° with respect to said first plurality of coordinate positions;

seventh finding an error sum for said updated ranges in said second plurality of coordinate directions for said selected convergence parameter; and eighth finding a smallest error sum to a corresponding coordinate direction using said second 8. A passive location method as claimed in claim 7, wherein there is further included the steps of:

fifth determining whether the value of said smallest error sum is less than said error sum for said second plurality of coordinates;

second moving said new coordinate position in the coordinate position of said second plurality of corresponding to said smallest error sum, if said smallest error sum is less than said error sum for said second plurality of coordinates; and third iterating said steps of: selecting, updating, fifth finding, sixth finding, third determining, moving, second iterating, fourth determining, selecting a second convergence parameter, third iterating, second updating, seventh finding, eighth finding, fifth determining, and second moving.

9. A passive location method as claimed in claim 8, wherein there is further included the steps of:

sixth determining whether said selected convergence parameter is said second parameter of said set, said sixth determining being performed in response to said smallest error sum being greater than said error sum of said coordinate positions of said step of fifth determining;

second selecting a third convergence parameter of said set; and fourth iterating said steps of: fifth finding: sixth finding, third determining, selecting a second convergence parameter, third iterating, second updating, seventh finding, eighth finding, fifth determining, second moving, third iterating, sixth determining, and second selecting.

10. A passive location method as claimed in claim 9, wherein there is further included the step of ninth finding a residual error of said new coordinate position which is convergent upon said actual position of said passive location device, said step of ninth finding being performed in response to said step of sixth determining indicating that said selected convergence parameter is said third convergence parameter.

11. A passive location method as claimed in claim 10, wherein there is further included the step of:

setting said first, second and third convergence parameters to values that result in the minimized total number of iterations of said passive location method, said values of said convergence parameters determined by the parameters of said simulated battlefield, including a desired radius of convergence of said actual position of said passive location device.

12. A passive location method as claimed in claim 11, said step of updating including the step of solving the second range difference equation for a position error gradient, ERROR:

$$ERROR = \sum_{i=2}^{N} abs[TA_i - ta_i]$$

where $TA_i$ is a measured timing difference error given by the first range difference equation:

$$TA_i = \Delta T_i - \Delta T_1$$

where $\Delta T_i$ if the number of clock cycles, $T_0$, measured from a time which said passive location device receives a message from a first to respond of said actuators; $\Delta T_i$ is the same from impact of the munition until the first coded pulse from an actuator is received and $ta_i$ is an estimated timing difference error given said new coordinate position of said passive location device and N is the number of said actuators.

13. A passive location method as claimed in claim 12, said step of eighth finding including the step of solving the estimated second difference equation for an estimated position error gradient, $ERROR_{62}$:

$$ERROR_\beta = \sum_{i=2}^{N} abs[TA_i - ta_{\beta i}], \beta = 1,2,3,4$$

where $\beta$ refers to each of said four new candidate directions (+X, −X, +Y and −Y) with coordinates and $$X_{62} = X_0 \Delta \beta, \beta = 1.2$$

$$Y_{62} = Y_0 \pm \Delta \beta, \beta = 3.4$$

where $X_0$ and $Y_0$ refers to said previous coordinate position estimated and the increments of position change $\Delta \beta$ assume one of said set of convergence parameters $\Delta \beta$ positive for $\beta = 2.4$ 14. A passive location device for determining a actual coordinate position of personnel and vehicles having said passive location device, relative to an impact point of a round of munition within a simulated battlefield from messages transmitted from a plurality of actuators, for assessing injuries and damage to said personnel and vehicles inflicted by the round of munition, said passive location device comprising:

input means for receiving said messages and producing decoded messages;

microprocessor means connected to said input means, said microprocessor means operating in response to said decoded messages and further operating to execute programs;

means for initializing said passive location device with a plurality of parameters by said transmitted messages of said actuators;

first memory means connected to said microprocessor means, said first means operating to store a plurality of input parameters;

program location means;

said program location means including:

means for setting by said passive location device an initial coordinate position of said passive location device as being located at said impact point;

means for estimating by said passive location device a plurality of new coordinate positions and corresponding coordinate directions of said passive location device from a previous coordinate position to produce a new candidate coordinate position, said means for estimating including means for selecting a first one of a set of convergence parameter;

means for finding by said passive location device coordinate directions from said plurality of coordinate directions having a smallest error metric derived from computation of second range differences for said estimated new coordinate positions said means for finding including:

means for updating ranges of said new candidate coordinate position by said selected convergence parameter; and means for fifth finding an error sum for said updated ranges in each of said coordinate directions by said selected convergence parameter;

means for determining by said passive location device a new coordinate position of said passive location device located a distance of a predetermined step size from said previous coordinate position in said coordinate directions corresponding to said smallest error metric;

means for iterating by said passive location device a predetermined number of times to produce said new coordinate position which converges to the actual position of said passive location device; and second memory means connected to said microprocessor means, said second memory means for storing said program location means;

said program location means operating under control of said microprocessor means to determine said actual coordinate positions of said passive location device; and means for indicating by each said passive location device the affects of said round of munition of said personnel and vehicles, as having been hit or missed by said round of munition.

15. A passive location device as claimed in claim 14, said input means including:

antenna means for receiving transmissions from said plurality of actuators;

means for receiving said transmissions, said means for receiving connected to said antenna means;

decoding means for obtaining data from said transmissions, said decoding means connected to said means for receiving; and position timing error means for calculating errors in estimates of said actual position of said passive location device.

16. A passive location device as claimed in claim 14, said first memory means including electronically erasable programmable read-only-memory means.

17. A passive location device as claimed in claim 14, said second memory means including programmable read-only-memory means.

18. A method of simulating combined arms fire support across a realistic battle field environment through which actual battle personnel and equipment, each having a passive location device, can be moved by locating each of plurality of said passive location devices relative to an impact point of a round of said simulated combined arms fire support, including a plurality of actuators for transmitting a plurality of messages to each of said passive location devices, comprising:

transmitting by said actuators a plurality of signals across a geographical zone selected as the area of ground affected by the simulated combined arms fire support;

independently determined by each said passive location device, at the geographical zone, and for each personnel and equipment within the geographical zone, whether each such personnel and equipment is to be indicated as having been hit by the simulated combined arms fire support;

said step of independently determining including the steps of:

initializating each said passive location device with a plurality of parameters by said transmitted messages of said actuators;

setting by said passive location device an initial coordinate position of each said passive location device as being located at said impact point;

estimating by said passive location device a plurality of new coordinate positions and corresponding coordinate directions of each said passive location device from a previous coordinate position to produce a new candidate coordinate position, said step of estimating including the step of selecting a first one of a set of convergence parameters;

finding by said passive location device coordinate directions from said plurality of coordinate directions having a smallest error metric derived from computation of second range differences for said estimated new coordinate positions, said step of finding including the steps of:

updating ranges of said new candidate coordinate position by said selected convergence parameter; and ranges in each of said coordinate directions by said selected convergence parameter;

determining by said passive location device a new coordinate positions of each said passive location device located a distance of a predetermined step size from said previous coordinate position in coordinate directions corresponding to said smallest error metric; and steps of estimating, finding and determining a predetermined number of times to produce said new coordinate position which converges to the actual position of said passive location device;

said method of simulating combined arms fire support further including the steps of:
assigning, to each such personnel and equipment, a probability logic of being hit by each type of combined arms fire support to be simulated; and plurality of signals, the probability logic at each such personnel and equipment to indicate which have been hit by the simulated combined arms fire support so that random total hits of personnel and equipment can result from different simulations of the same combined arms fire support.

19. A method as claimed in claim 18, wherein said step of transmitting includes transmitting at least three radio waves via said actuators across the geographical zone in a timed sequence.

20. A method as claimed in claim 19, said step of updating including the step of solving the second range difference equation for a position error gradient, ERROR:

$$\text{ERROR} = \sum_{i=2}^{N} \text{abs}[TA_i - ta_i]$$

where $TA_i$ is a measured timing difference error given by the first range difference equation:

$$TA_i = \Delta T_i - \Delta T_1$$

where $\Delta T_i$ if the number of clock cycles, $T_0$, measured from a time which said passive location device receives a message from a first to respond of said actuators; $\Delta T_i$ is the same from impact of the munition until the first coded pulse from an actuator is received and $ta_i$ is an estimated timing difference error given said new coordinate position of said passive location device and N is the number of said actuators.

21. A method as claimed in claim 20, said step of second finding including the step of solving the estimated second difference equation for an estimated position error gradient, $\text{ERROR}_{62}$:

$$\text{ERROR}_\beta = \sum_{i=2}^{N} \text{abs}[TA_i - ta_{\beta i}], \beta = 1,2,3,4$$

where $\beta$ refers to each of said four new candidate directions (+X, −X, +Y and −Y) with coordinates and $$X_\beta = X_0 \pm \Delta \beta, \beta = 1,2$$

$$Y_\beta = Y_0 \pm \Delta \beta, \beta = 3,4$$

where $X_0$ and $Y_0$ refers to said previous coordinate position estimated and the increments of position change $\Delta \beta$ assume one of said set of convergence parameters $\Delta \beta$ positive for $\beta = 1,3$ and negative for $\beta = 2,4$.

22. A battlefield simulator system for simulating the effect of firing a munition at a preselected target area, comprising:
master station means for transmitting, to remote actuators, first control signals in response to selection of the target area, wherein said master station means is operable away from said munition and wherein said remote actuators are remotely located from said master station means at a plurality of spaced locations;
each respective one of said remote actuators including means for receiving said first control signals transmitted by said master station means and for determining if the respective remote actuator has been actuated in response to said first control signals, and means for transmitting, in response to selection of the respective remote actuator, second control signals to indicators mounted on battlefield targets;
wherein each of said indicators includes means for receiving said second control signals from a plurality of said remote actuators;
means for initializing each said indicators with a plurality of parameters by said transmitted second control signals of said actuators;
each of said indicators further includes program means for determining its actual coordinate location within said target area of said battlefield targets by convergence techniques with respect to an impact point of said munition;
said program means including:
means for setting by said indicator an initial coordinate position of each said indicator as being located at said impact point;
means for estimating by said indicator a plurality of new coordinate positions and corresponding coordinate directions of each said indicator from a previous coordinate position to produce a new candidate coordinate position, said means for estimating including means for selecting a first one of a set of convergence parameters;
means for finding by said indicator coordinate directions from said plurality of coordinate directions having a smallest error metric derived from computation of second range differences for said estimated new coordinate positions, said means for finding including:
means for updating ranges of said new candidate coordinate position by said selected convergence parameter; and
means for second finding an error sum for said updated ranges in each of said coordinate directions by said selected convergence parameter;
means for determining by said indicator a new coordinate position of each said indicator located a distance of a predetermined step size from said previous coordinate position in coordinate directions corresponding to said smallest error metric; and
means for iterating by said indicator a predetermined number of times to produce said new coordinate position which converges to the actual position of said passive location device; and
each of said indicators for determining from a presassigned probability whether the respective target to which the respective indicator has been mounted is disabled by the simulated munition.

* * * * *

UNITED STATES PATENT AND TRADEMARK OFFICE
CERTIFICATE OF CORRECTION

PATENT NO. : 4,976,619

DATED : December 11, 1990

INVENTOR(S) : Eric J. Carlson

It is certified that error appears in the above-identified patent and that said Letters Patent is hereby corrected as shown below:

In column 9, claim 5, line 17, change "interating" to --iterating--; and after the "of", change the semi-colon ";" to a colon --:--.

In column 9, claim 7, line 39, after "second" insert --plurality of coordinate directions.--.

In column 9, claim 9, line 67, after "determining" insert --moving, second iterating, fourth determining,--.

In column 10, claim 11, line 19, after "a" there should be no new paragraph.

In column 10, claim 12, line 35, change "if" to --is--.

In column 10, claim 13, line 46, after "ERROR" change "62" to --$\beta$--; lines 55-58, change "62" to --$\beta$--; and line 55, after "$X_0$" insert --$+$--; line 55, change "1.2" to --1,2--; line 58, change "3.4" to --3,4--; and line 62, change "2.4" to --2,4--.

In column 11, claim 14, line 13, after "first" insert --memory--; and line 57, change "position" to --position--.

In column 12, claim 18, line 26, change "determined" to --determining--; line 56, after "and" begin a new paragraph and insert --second finding an error sum for said updated--; line 59, change "positions" to --position--; and line 64, before the first word "steps" insert --iterating by said passive location device said--.

In column 13, claim 18, line 6, before "plurality" insert --actuating, in response to the transmitted--.

UNITED STATES PATENT AND TRADEMARK OFFICE
CERTIFICATE OF CORRECTION

PATENT NO. : 4,976,619

DATED : December 11, 1990

INVENTOR(S) : Eric J. Carlson

It is certified that error appears in the above-identified patent and that said Letters Patent is hereby corrected as shown below:

In column 13, claim 21, line 40, after "ERROR" change "62" to --6--.

In column 13, claim 22, line 62, after "of" insert --a particular type of simulated munition and in response to selection of--.

Signed and Sealed this

Twentieth Day of October, 1992

Attest:

DOUGLAS B. COMER

Attesting Officer      Acting Commissioner of Patents and Trademarks

UNITED STATES PATENT AND TRADEMARK OFFICE
CERTIFICATE OF CORRECTION

PATENT NO. : 4,976,619

DATED : December 11, 1990

INVENTOR(S) : Eric J. Carlson

It is certified that error appears in the above-identified patent and that said Letters Patent is hereby corrected as shown below:

In column 13, claim 20, line 29, delete "if" and substitute --is--.

Signed and Sealed this

Nineteenth Day of October, 1993

*Attest:*

BRUCE LEHMAN

*Attesting Officer*   *Commissioner of Patents and Trademarks*